F. P. MIES.
HEATING AND VENTILATING APPARATUS.
APPLICATION FILED MAY 16, 1910.
1,041,322.
Patented Oct. 15, 1912.
4 SHEETS—SHEET 1.
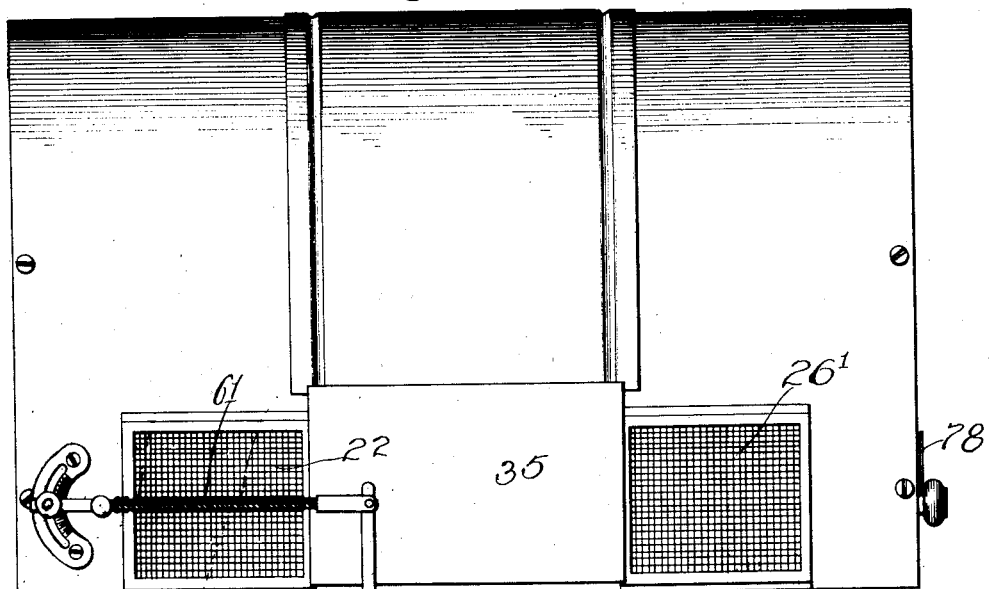
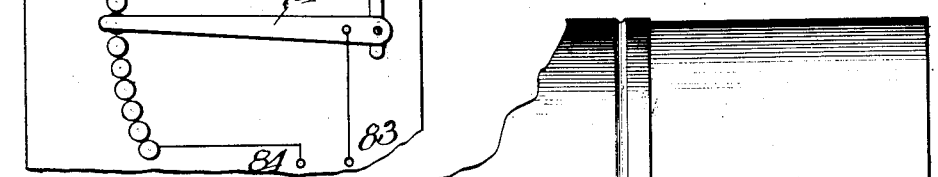
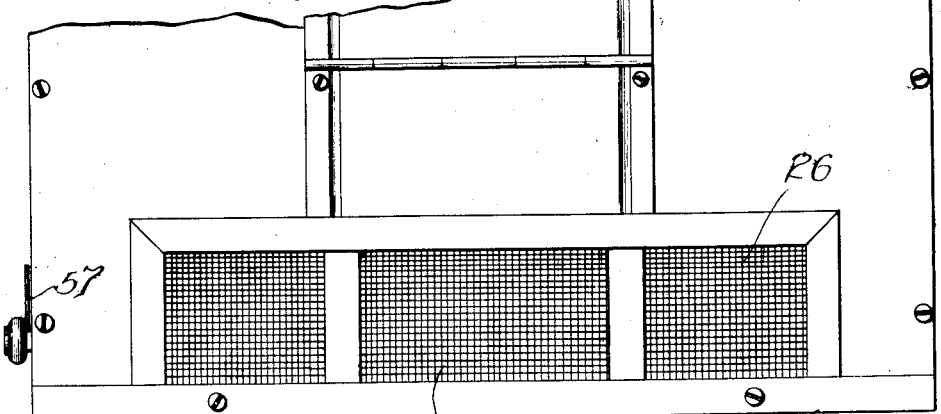

F. P. MIES.
HEATING AND VENTILATING APPARATUS.
APPLICATION FILED MAY 16, 1910.
1,041,322.
Patented Oct. 15, 1912.
4 SHEETS—SHEET 2.
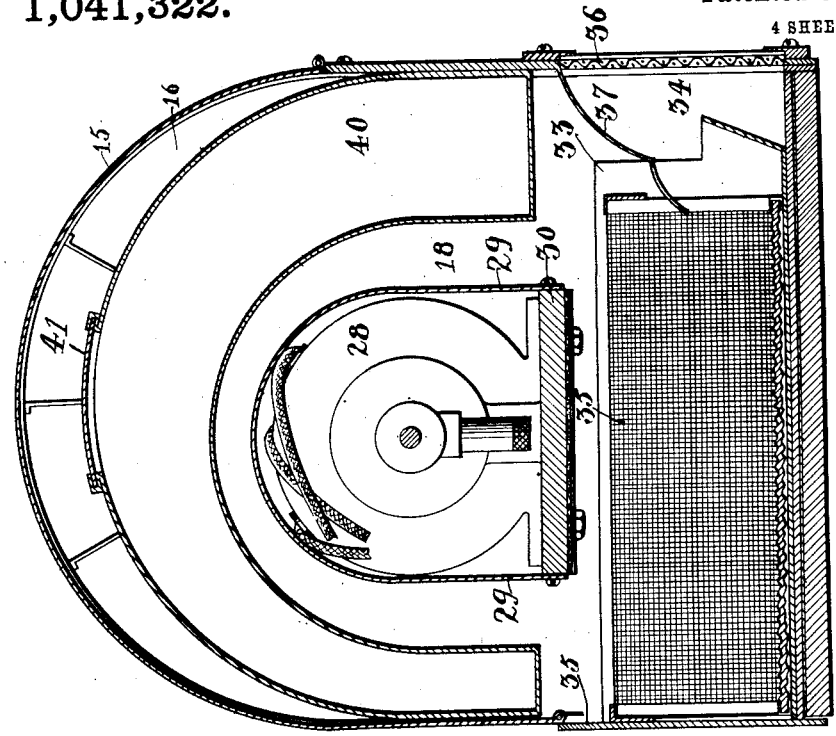
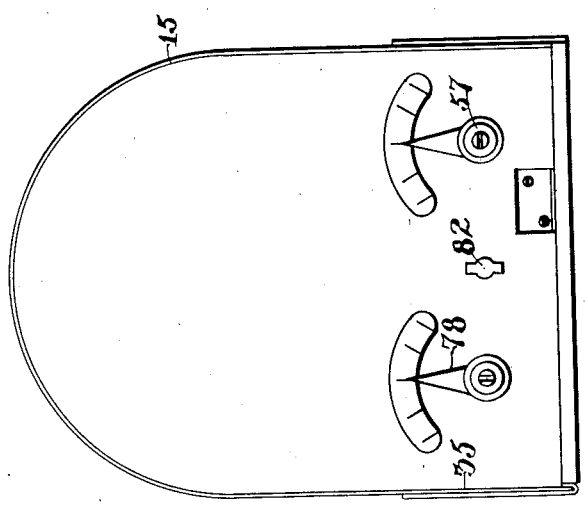
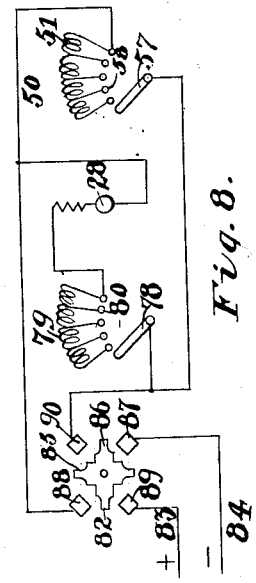
Witnesses.
Inventor.
Frank P. Mies
By his Attorneys.

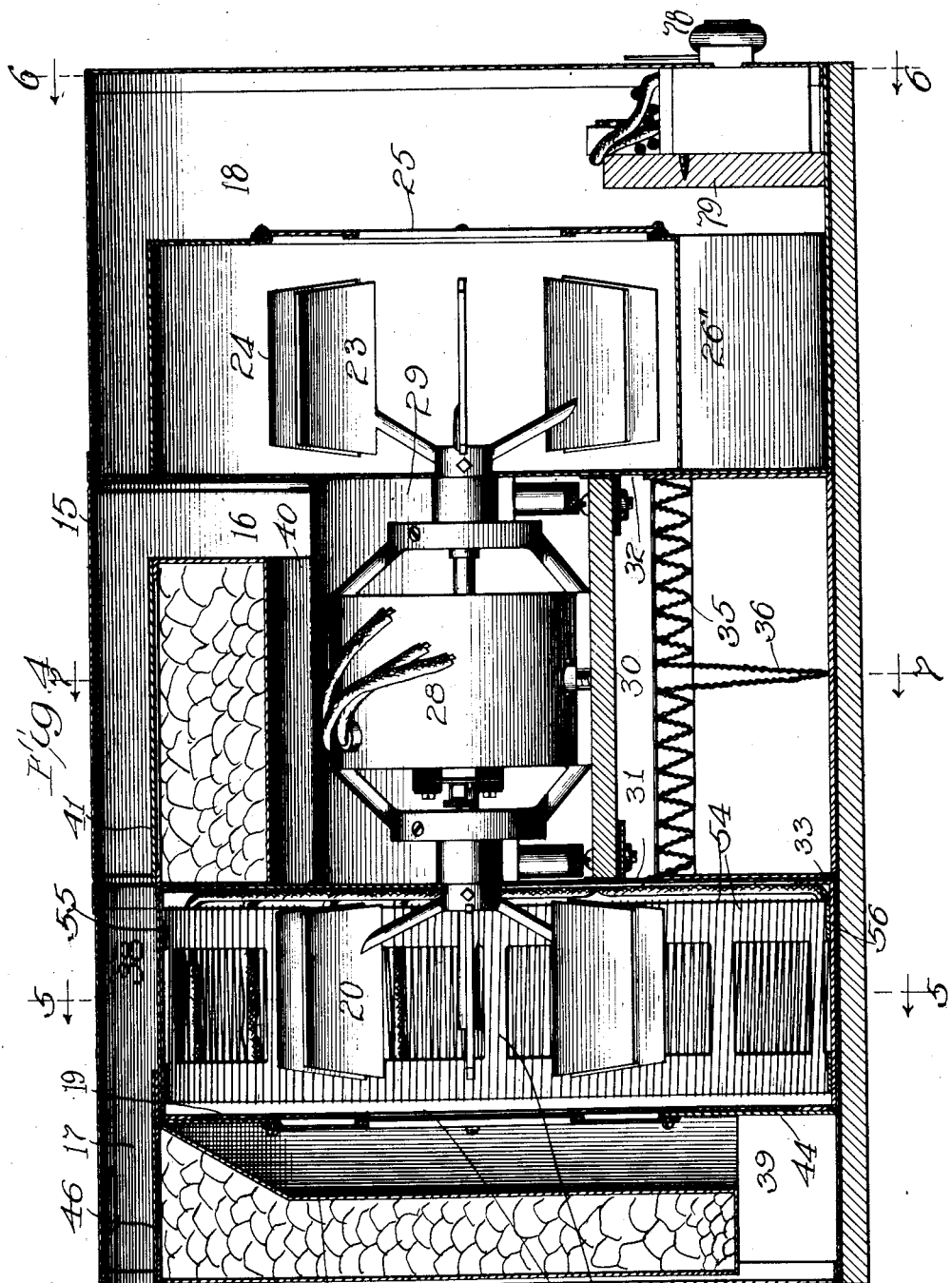

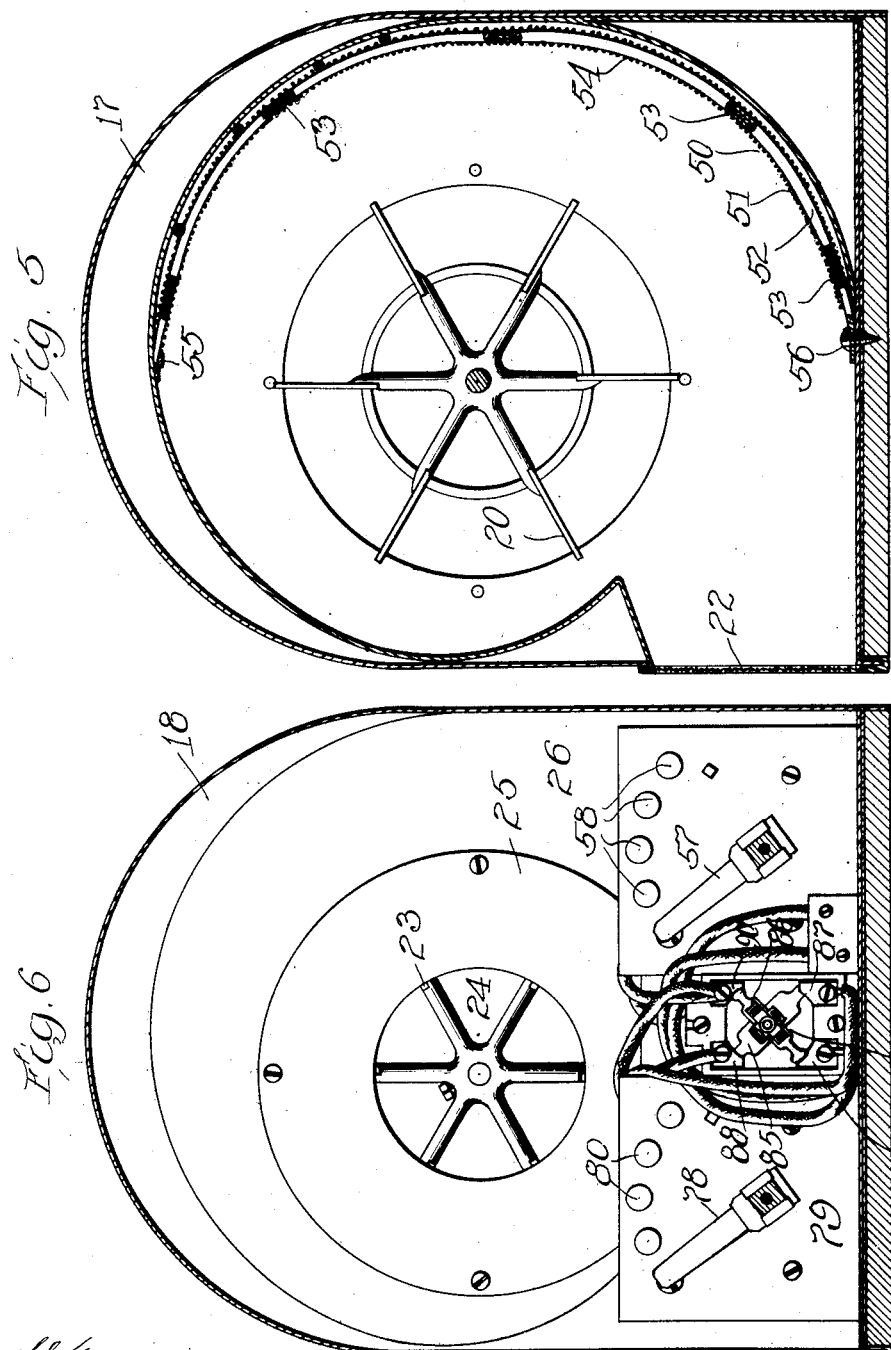

UNITED STATES PATENT OFFICE.

FRANK P. MIES, OF CHICAGO, ILLINOIS, ASSIGNOR TO THE PLURAL SYSTEM VENTILATOR CO.

HEATING AND VENTILATING APPARATUS.

1,041,322. Specification of Letters Patent. Patented Oct. 15, 1912.

Application filed May 16, 1910. Serial No. 561,617.

*To all whom it may concern:*

Be it known that I, FRANK P. MIES, a citizen of the United States, residing at Chicago, in the county of Cook and State of Illinois, have invented certain new and useful Improvements in Heating and Ventilating Apparatus, of which the following is a specification.

My invention relates to improvements in electric heating and ventilating apparatus, and has for one of its objects to provide a neat, convenient, efficient, and portable apparatus for the purposes described.

Other and further objects of my invention will become apparent to persons skilled in the art from a consideration of the specification taken in conjunction with the drawings, wherein—

Figure 1 is a side elevation of the device; Fig. 2 is a side elevation taken from the opposite side of the device; Fig. 3 is an end elevation; Fig. 4 is a longitudinal central section of the device; Fig. 5 is a cross sectional view taken on line 5—5 of Fig. 4; Fig. 6 is a cross sectional view taken on line 6—6 of Fig. 4; Fig. 7 is a cross sectional view taken on line 7—7 of Fig. 4; Fig. 8 is a diagrammatic view of the electric circuits through the device.

In all of the views the same reference characters indicate similar parts.

The casing containing the apparatus is generally indicated by 15, and is divided into three compartments, a central compartment containing an electric motor, the shaft of which extends in both directions into a compartment on either side thereof. Each said compartment contains a fan, securely fixed to the respective ends of the motor shaft.

16 is a central compartment, and 17 and 18 are the side compartments. In the compartment, 17, the fan casing 19 is contained. In this a fan, 20, is operated. The inlet or eye of the fan 21 is located near the axis thereof, and the discharge or side opening is shown at 22, in Fig. 1. The fan 20 is a fresh air fan and is arranged to draw fresh air into the compartments in which the device is located.

23 is the foul air fan, located in the fan casing 24, having an inlet opening 25 and a discharge opening, 26. The air that comes into the casing, 18, comes through the opening 26 and passes through the casing 18 into the opening 25 of the fan, 23. It is expelled through the opening, 26', shown in Fig. 1. Thus, the foul air enters the casing 18 from the compartment at the opening, 26', and passes out at the opening 26 on the opposite side thereof to the atmosphere.

The motor is adapted to operate both of the fans. The motor 28 is preferably surrounded by a substantially water tight casing, 29, and is supported in position on the base, 30, which is secured between the side walls, 31 and 32, of the casing, 16. In the lower part of the casing 16 is a water tank or drawer, 33, which is adapted and arranged to be removed therefrom for the purpose of filling with water. A lip, 34, on the rear portion of the drawer, is a means by which the drawer may be conveniently filled with the humidifying element, 35, is placed in the drawer. The humidifying element, 35, is a zig-zag structure, perforate, porous, and corrugated, and preferably made of two layers of wire cloth having a material such as cloth or the like for retaining and holding moisture inclosed therebetween, and providing an effectual screen for the air which passes through this part of the device. A part 36 of the device extends downwardly into the bottom of the drawer, 33 in contact with the water to be contained therein. The capillary structure provided in this device serves to lift the water and distribute it throughout the parts which overlie the drawer, thereby providing a large effective perforate dampened surface for contact with the incoming air. Deflectors, 37, are arranged in front of the opening, 36, and are curved in such a way as to deflect the incoming air into the body portion of the drawer, 33, and under the porous, distributing medium, 35, so that it will be necessary for the air to pass up through this medium on its way to the fan. The deflector 37 is so arranged that the drawer may be removed without disturbing the deflector.

The air passes into the drawer, 33, and up through the dampening screen, 35, and into the chamber, 16. It then passes around through the passageway, 38, into the chamber, 39, and into the eye, 21, of the fan, 20, and finally out of the fan casing through the screen discharge opening, 32, into the apartment into which air is to be introduced.

When it is desired that the air, passing through the fan, 20, shall be cooled before its introduction into the apartment, I provide a crescent-shaped ice chamber, 40, having a closure, 41 in its top surface for closing the opening through which ice or the like may be introduced into the interior of the receptacle. Another receptacle, 45, is provided for containing a cooling material, such as ice, and is located in the chamber, 39. The receptacle 45 also has an opening for the reception of ice or similar material and is provided with a closure, 46. When it is not desired or necessary to reduce the temperature of the air, these cooling receptacles may be readily removed, and the fan will operate to project the air into the apartment with the same degree of efficiency as if the receptacles were present.

In cold weather when it becomes necessary to heat the air before introducing it into the apartment, I provide a heating device which I prefer to locate in the fan casing of the fan 20. The heating device 50 is preferably made in the general shape of the circumferential rear wall of the fan casing. Sheets of insulating material 51 and 52, are placed substantially parallel and are separated by spacing devices, 53, which are located at intervals thus providing spaces between the insulating strips. Around the insulating strips a conducting wire, 54, is wound. This structure affords a large exposed heating surface of the wire to the air which comes in contact therewith. The upper end of the heating medium is secured to the rear peripheral wall by a cleat, 55, and at its lower end by a screw, 56. When the screw, 56, is removed the heating medium may be bodily and easily removed from the fan casing. The heating medium is divided into a series of sections as diagrammatically shown in Fig. 12. A switch arm, 57, is adapted to pass successively over contacts, 58, connected with the various sections of the heating medium, whereby a greater or less quantity of the heating medium may be contained in circuit as may be desired, and the heating effect of the heating medium thus regulated.

Instead of using the hand switch, 57, and rheostat contacts, 58, for the purpose of regulating the heat, an automatic switch, 60, of any suitable construction may be employed. The construction shown involves a temperature-responsive bar 61, placed across the discharge opening of the pure air fan and having suitable connections with the lever arm 74 of a rheostat.

By referring to Fig. 6, it will be observed that on the left hand side of the figure, there is a controlling switch, 78 which is adapted to control the speed of the electric motor. A rheostat, 79, for the motor is shown in Fig. 4, as a block, and in Fig. 8, it is diagrammatically shown. The rheostat is divided into a series of sections connected to terminals 80, as usual in such devices.

A double pole main switch, 82, is a means by which the main circuit, consisting of mains, 83 and 84, is initially closed. The main switch consists of two insulated conducting bars, 85 and 86, which are adapted to connect the terminals, 87 and 88, 89 and 90, respectively. In the position shown the circuits are all open. The apparatus is adapted to be mounted on a board and placed by or near a window so that the air may be taken from the outside and heated or cooled, as the case may be, and projected into the interior of the apartment, and whereby the foul air may be taken from the apartment and directly exhausted into the outside atmosphere.

Having thus described my invention, what I claim is:

1. In an apparatus of the character described, a casing divided into three chambers, a central and two side chambers, a casing for a motor in the central chamber, and a casing for a fan in each of the side chambers, a motor in the motor casing, and a fan in each of the fan casings, said fans secured to opposite ends of the motor shaft, said fan casings each having an inlet and an outlet, an electric heating device in one of said fan casings, a temperature responsive device in the air path of the fan containing the heating device, and a switch controlled by said responsive device for varying the heating effect of said heating device.

2. In an apparatus of the character described, a casing divided into three chambers, a central and two side chambers, a casing for a motor in the central chamber, and a casing for a fan in each of the end chambers, a motor in the motor casing, and a fan in each of the fan casings, said fans secured to opposite ends of the motor shaft, said fans each having an inlet and an outlet, an electric heating device in one of said fan casings, and means for controlling the same.

3. In a device of the character described, a fan casing, a heating element curved to substantially correspond with the peripheral wall of said casing, a cleat at one end and a screw at the other end for securing said heating element in place.

4. In an apparatus of the character described, a casing providing a motor chamber and a fan chamber, a motor and a fan in said respective chambers, said casing providing a passage for air into the motor chamber, thence to the fan chamber, and thence to the exterior of said fan chamber, and a heater in the fan chamber to heat the air received from the motor chamber.

5. In an apparatus of the character described, a casing providing a motor chamber and a fan chamber, the walls of said casing being perforated and shaped to provide an inlet at the bottom of the motor chamber, a passage from the top of the motor chamber to the fan chamber, humidifying means in the motor chamber, and heating means in the fan chamber, an inclosed motor in the motor chamber and a fan in the fan chamber.

In testimony whereof I hereunto set my hand in the presence of two witnesses.

FRANK P. MIES.

In the presence of—
GEO. T. MAY, Jr.,
MARY F. ALLEN.